United States Patent

Lachiche

[15] 3,682,578
[45] Aug. 8, 1972

[54] DEVICE FOR THE CONTINUOUS MANUFACTURE OF ARTIFICIAL SPONGES

[72] Inventor: Julien Henri Lachiche, Rouen, France

[73] Assignee: Societe Novarel, Paris, France

[22] Filed: Feb. 10, 1971

[21] Appl. No.: 114,186

Related U.S. Application Data

[63] Continuation-in-part of Ser. No. 781,094, Dec. 4, 1968, abandoned.

[30] Foreign Application Priority Data

Jan. 21, 1971 France......................7101914
June 21, 1968 France........................155969
Dec. 12, 1967 France........................134015

[52] U.S. Cl. ...................425/86, 425/232, 425/174, 425/DIG. 13
[51] Int. Cl............................................B29c 3/04
[58] Field of Search........18/4 B, 4 S, 5 A, 5 P, 12 F, 18/12 SJ, DIG. 13, DIG. 16; 219/388, 437, 284, 288

[56] References Cited

UNITED STATES PATENTS

| | | | |
|---|---|---|---|
| 775,542 | 11/1904 | McConnell | 18/5 A |
| 2,323,191 | 6/1943 | Bennett | 18/DIG. 13 |
| 2,897,333 | 7/1959 | McFarlane et al. | 219/284 X |
| 3,011,218 | 12/1961 | Mitten | 18/4 B X |
| 3,281,894 | 11/1966 | Buff et al. | 18/4 B |
| 3,382,303 | 5/1968 | Stieg | 18/4 B X |
| 3,486,191 | 12/1969 | Bibost | 18/5 P |

*Primary Examiner*—Robert L. Spicer, Jr.
*Attorney*—Nathaniel L. Leek

[57] ABSTRACT

Device for the continuous manufacture of artificial sponges comprising a conveyor belt formed of flexible permeable material continuously passing through a passage in a fixed mold and carrying a paste formed of viscose, reinforcing material and porophorous material therethrough. Electrodes are provided in the mold for providing a current flow through the paste to coagulate it. The paste exudes a saline solution during the coagulation which passes out of the passage and is collected. Preferably the solution is collected in compartments provided adjacent to the passage and in communication therewith by a plurality of perforations in walls in the passage thereby improving current flow through the paste. These walls may be of conductive material in which case they form the electrodes or of insulating material in which case the electrodes are separate therefrom. Preferably, a plurality of pairs of pivoted form members are carried on a conveyor belt outwardly of the sheath passing through the passage.

15 Claims, 15 Drawing Figures

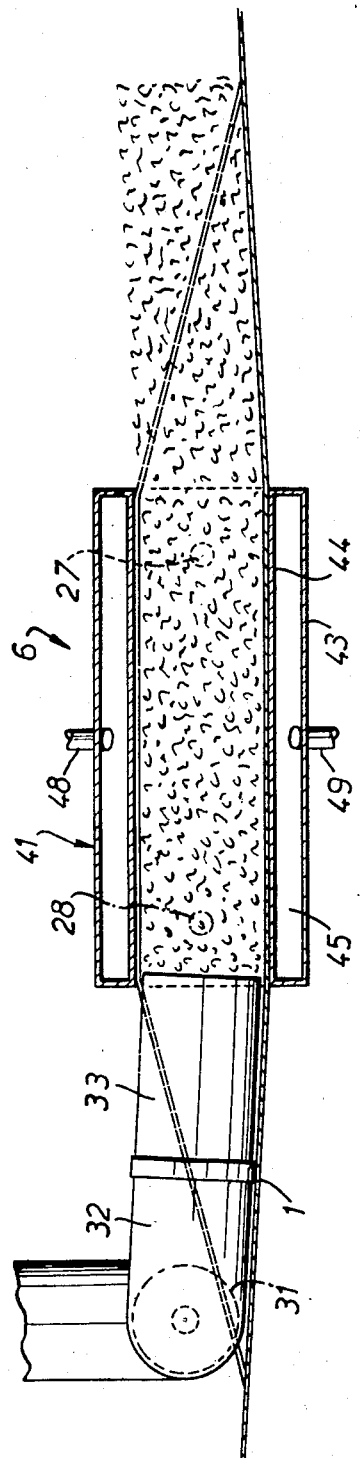
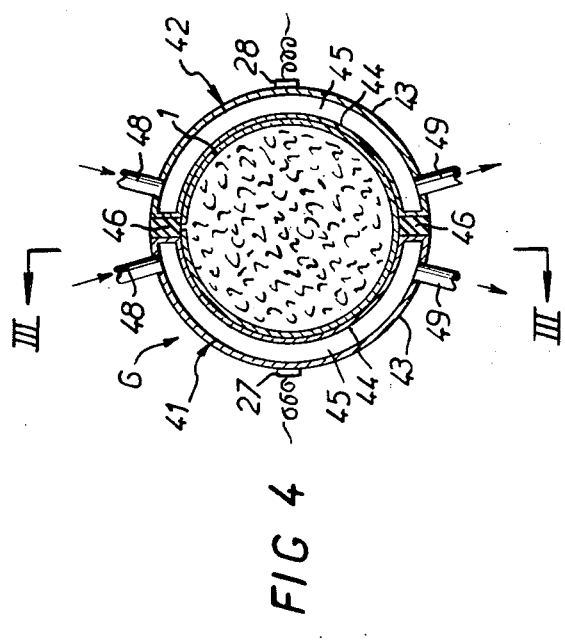
FIG. 3
FIG. 4

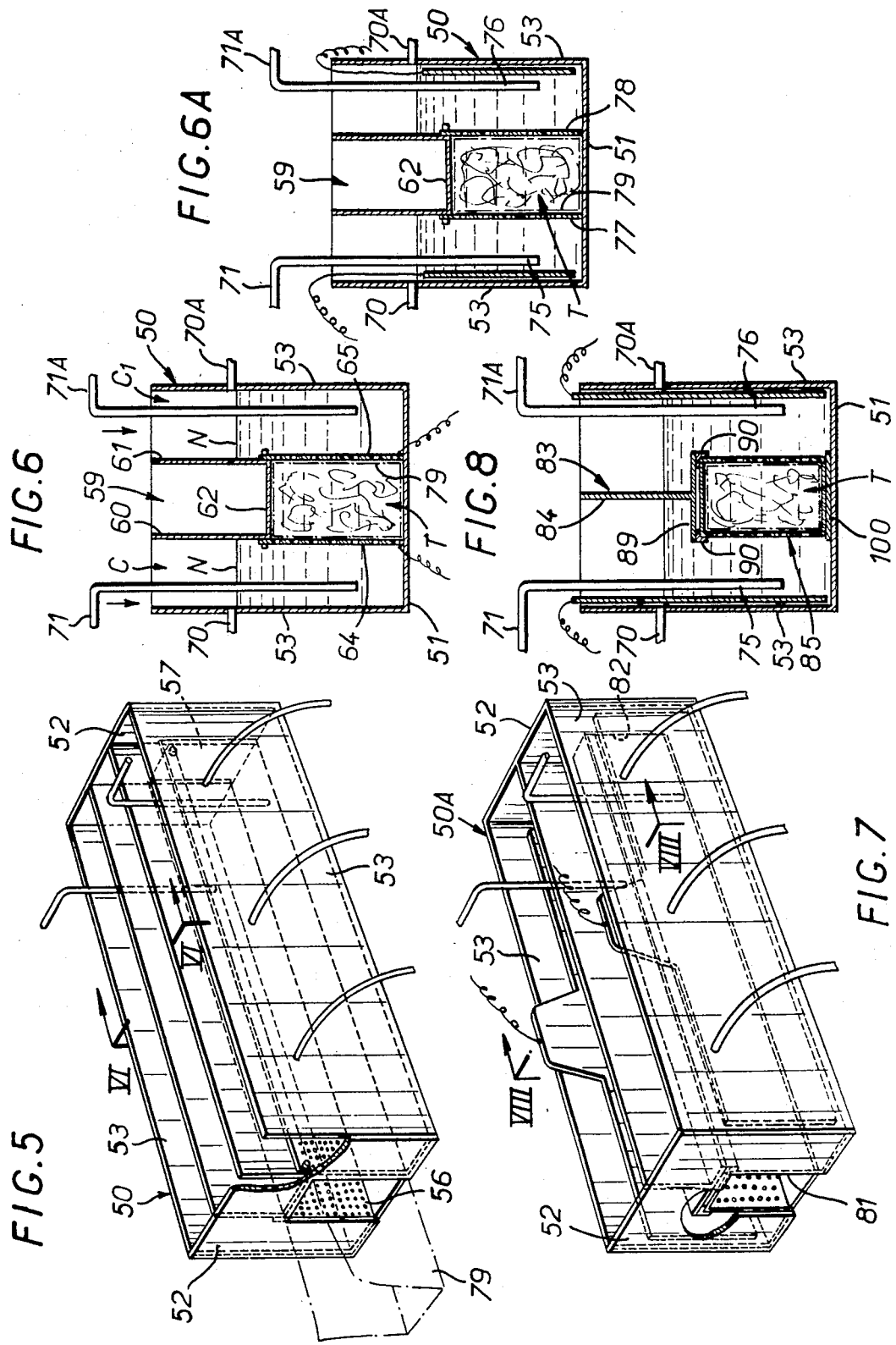

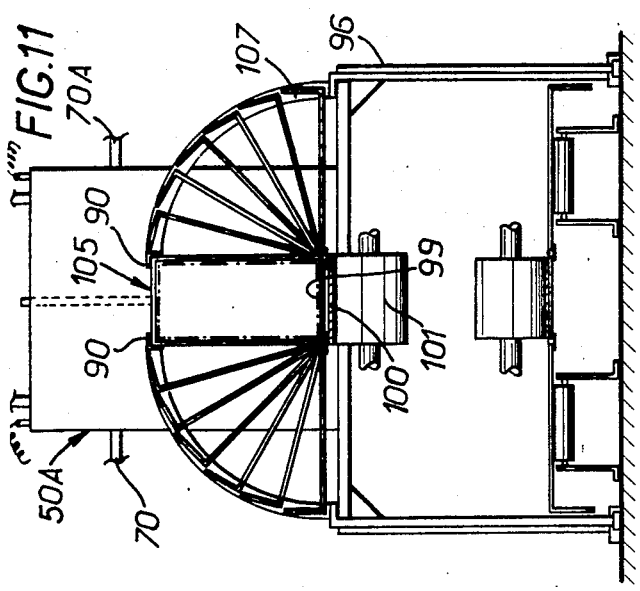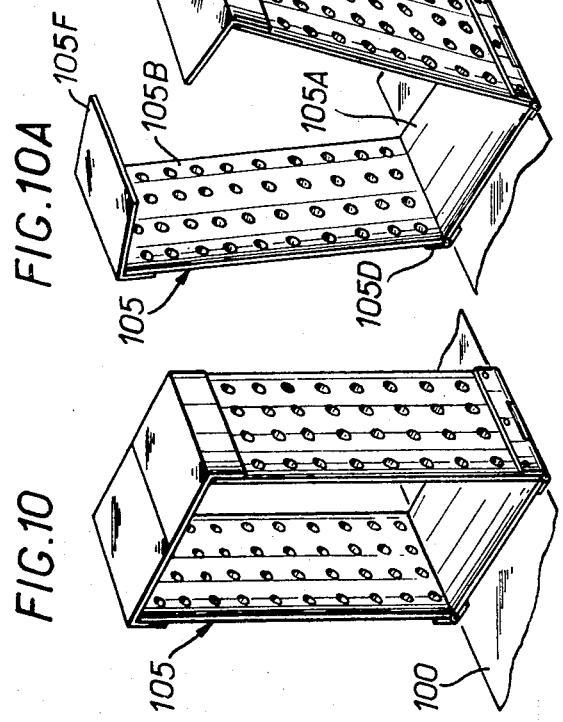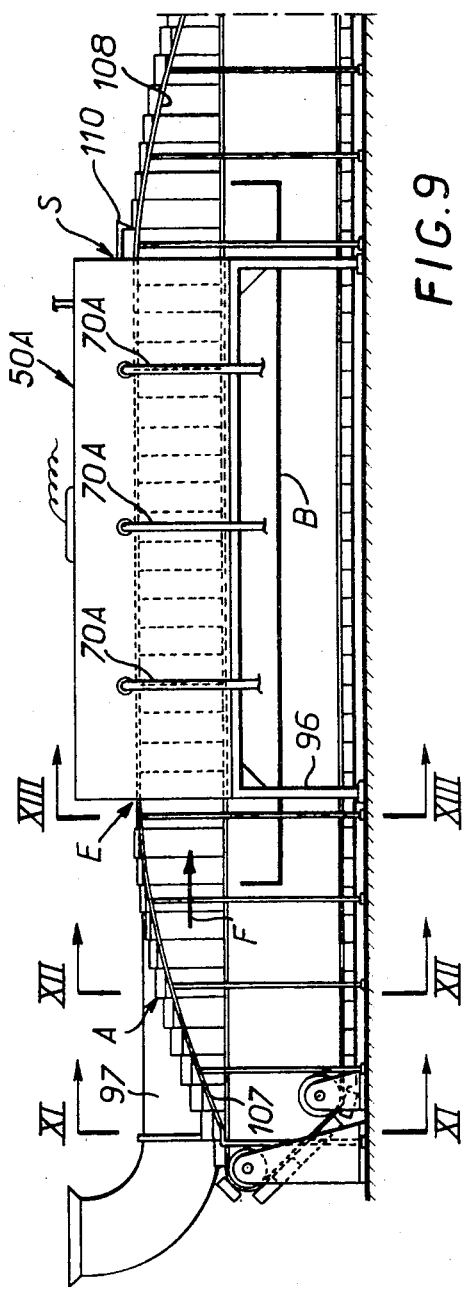

DEVICE FOR THE CONTINUOUS MANUFACTURE OF ARTIFICIAL SPONGES

CROSS-REFERENCE TO RELATED APPLICATION

The present application is a continuation-in-part of application Ser. No. 781,094, filed on Dec. 4, 1968, now abandoned.

BACKGROUND OF THE INVENTION

The present invention relates to the continuous manufacture of artificial sponges in particular cellulose sponges produced by coagulation of a pulp or paste composed of viscose, reinforcing material and porophorous or porosity-creating material.

Devices for the continuous manufacture of cellulose sponges by electric coagulation are known in which the coagulation is effected in two steps and the sponges resulting therefrom have irregular outer surfaces due to the rubbing of the mass along the electrodes during coagulation. Other devices use electrodes which move with the pulp or paste during the coagulation. Such devices are mechanically complicated and require considerable maintainenance.

SUMMARY OF THE INVENTION

An object of the present invention is to overcome the drawbacks of such known devices and provide a device for producing homogeneous sponges.

It is another object of the present invention to provide a device for the continuous manufacture of artificial sponges by carrying paste in a continuous manner through a passage disposed entirely with a fixed mold by means of a flexible permeable sheath passing through the passage and adapted to conform to the shape thereof.

It is another object of the present invention to provide means for removing the solution exuded by the paste during its coagulation in the mold from the passage.

A more particular object of the present invention is a device for the continuous production of artificial sponges comprising : a fixed elongate mold having an inlet opening at one end, and outlet opening at the other and a passage disposed therebetween entirely enclosed within the mold, a permeable flexible sheath for carrying a paste composed of viscose, reinforcing material, and porophorous material continuously through said passage, electrode means arranged in the mold outwardly of the path of the sheath through the passage for passing an electric current through the paste being conveyed, and means for allowing solution exuded from the paste during the coagulation to pass outwardly through the enclosure in order to be collected.

It has been determined that the service life of permeable sheath of such a device is reduced by electric arcs which develop in the passing of the current through the paste.

Accordingly it is a further object to provide means for reducing such arcing comprising placing the electrodes in an electrolytic media which is in communication with the paste being carried through the passage.

The flow of electric current through the paste itself is also considerably improved which thereby effects a more regular coagulation of the paste and a more homogeneous sponge.

A further more particular object according to the invention consists in a device for the continuous production of artificial sponges comprising a fixed mold including a coagulation enclosure adapted to receive a constant procession of paste to be coagulated conveyed in a permeable sheath, at least two independent compartments being arranged adjacent the coagulation enclosure and containing electrolytic solution, means enabling the flow of solution between the compartments and the interior of the coagulation enclosure, and electrode means at least partially extending into the solutions in the compartments for applying an electric current for coagulating the paste.

Preferably, the electrolytic solution is formed by solution exuded by the paste and passing out of the passage.

Accordingly to a preferred embodiment the coagulation enclosure comprises a plurality of pairs of form members pivotally mounted on a conveyor belt adapted to be continuously carried through the passage in the mold. Preferably, converging surfaces are provided upstream of the inlet end of the mold for progressively closing associated pairs of form members, and divergent surfaces are provided downstream of the outlet end of the mold for enabling the progressive opening of the form members.

Other features and advantages of the present invention will be brought out in the description which follows made by way of example with reference to the accompanying drawings.

BRIEF DESCRIPTION OF THE DRAWINGS

FIG. 3 show an enlarged longitudinal section of a fixed mold having both fluid heating and electric heating for coagulating the paste taken along line III—III of FIG. 4;

FIG. 4 shows an enlarged cross-section of the fixed mold taken along the line IV—IV of FIG. 1;

FIG. 5 shows a schematic view in perspective of an alternative embodiment of the mold according to the invention;

FIG. 6 shows a cross-section of the mold of FIG. 5 taken along the line VI—VI;

FIG. 6A shows a variation of the mold of FIGS. 5 and 6 in which the electrodes are arranged remote from the coagulation enclosure;

FIG. 7 shows a schematic view in perspective of a variation of the embodiment shown in FIG. 5;

FIG. 8 shows a cross-section of the mold in FIG. 7 taken along the line VIII—VIII;

FIG. 9 shows a front elevation of a further alternative embodiment of the mold according to the invention including a coagulation enclosure comprising pivoted pairs of form members;

FIGS. 10 and 10A show enlarged details in perspective of a pair of the form members in their closed and open positions respectively;

FIG. 11 shows a cross-section of the device of FIG. 9 taken along the line XI—XI;

DESCRIPTION OF THE PREFERRED EMBODIMENTS

Figure 1:
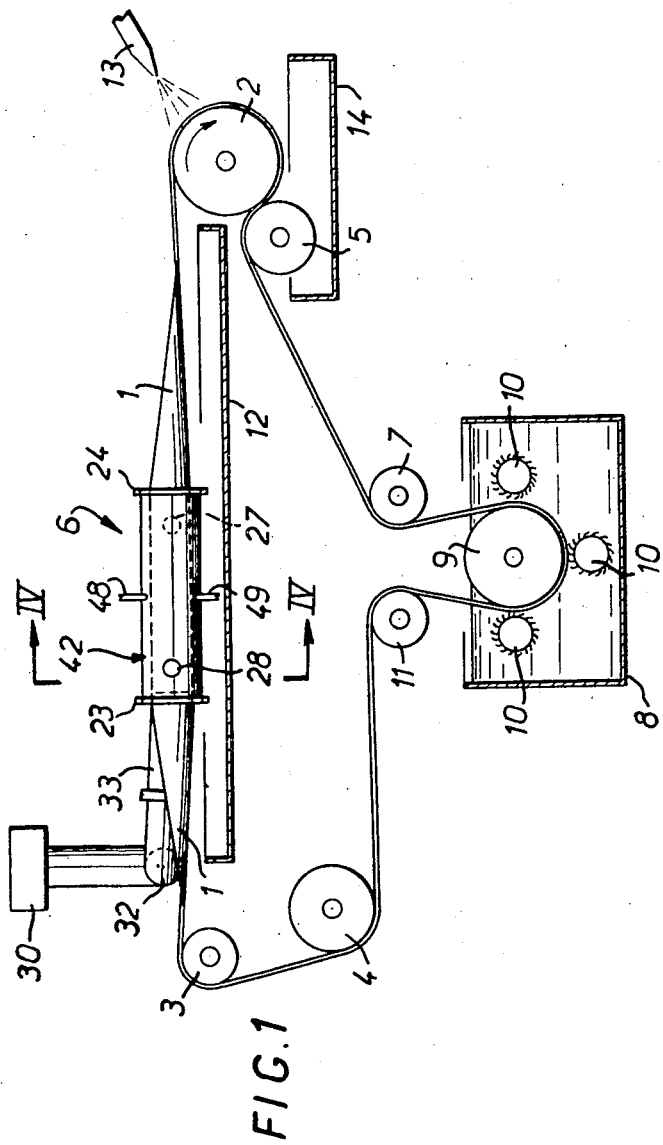
FIG. 1 shows a schematic side elevation of a device for the manufacture of artificial sponges according to the invention.

In the embodiment shown in FIGS 1 to 4, the device according to the invention comprises an endless conveyor belt 1 formed of a permeable band of woven fabric, for example a polyester fabric weighing 230 grams per square meter. The belt 1 is supported by cylinders 3 and 4 which are freely rotatable and by a cylinder 2 which is positively driven. A cylinder 5 urges the conveyor belt 1 in contact with the cylinder 2 and thereby enables its movement.

The upper side of the belt 1 passes into a cylindrical fixed mould 6 arranged substantially horizontally. The lowermost portion of the passage is located slightly below the substantially horizontal plane tangent to the uppermost portion of the cylinders 2 and 3. The conveyor belt 1 conforms to the shape of the interior wall or passage of the mold 6 as it passes in the mold to completely cover this wall or passage. The lower side of the conveyor belt 1 is driven by a return roller 7 upwards a device for cleaning the belt comprising a washing tank 8, a conductive cylinder 9 and rotating brushes 10 adjacent to the cylinder 9. A roller 11 drives the conveyor belt 1 back towards a supporting cylinder 4.

A spray device 13 is mounted for oscillation in the vicinity of the cylinder 2 to spray the upper side of the conveyor belt 1 carried out the cylinder. A tank 12 for recovering saline solution given up by the paste during the molding operation is located beneath the conveyor belt 1, and a recovery pan 14 is placed beneath the cylinder 2.

Means for supplying the paste comprises a hopper 30 ending in a tube and associated with a feed screw 31. The tube has an elbow portion 32 to which is fixed a flexible sleeve 33 formed of rubber which is in contact with the top side of the conveyor belt; the end 34 of the tube passes a few centimeters into the interior of the mold 6 adjacent the conveyor belt which is in contact with the interior wall of the mold 6.

FIGS. 3 and 4 show longitudinal and transverse section respectively of an embodiment of the mold 6. In this embodiment the heating for coagulation is provided by electrical means as well as by heating fluid means. The mold 6 comprises a pair of semi-cylindrical annular shells 41 and 42 each having an outer wall 43 and an inner wall 44 and a space 45 therebetween. An inlet 48 and an outlet 49 are provided for each of the shells so that a heating fluid can circulate through the mold thereby heating the paste passing therethrough. The shells 41 and 42 are electrically isolated from each other by insulating spacers 46 provided therebetween. The shells 41 and 42 are connected by means of terminals 27 and 28 respectively to alternating current sources (not shown).

Figure 2:
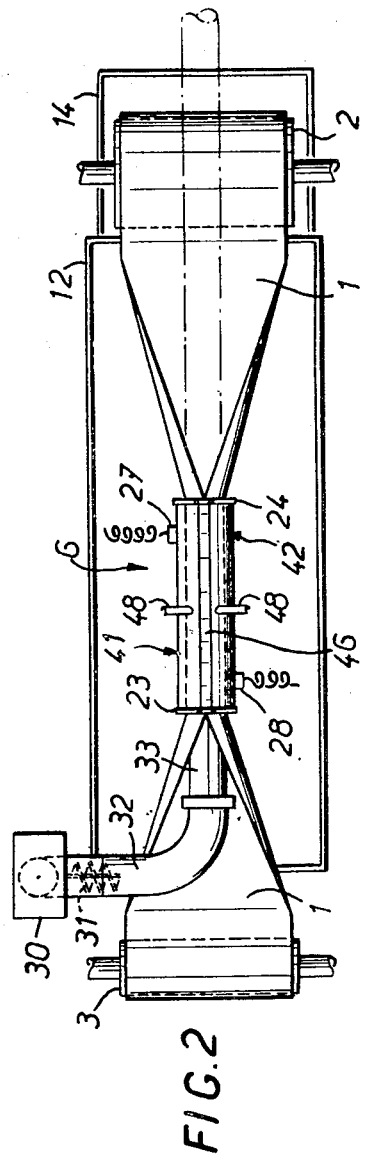
FIG. 2 shows a schematic plan view of a part of the device including a fixed mold.
Figure 13:
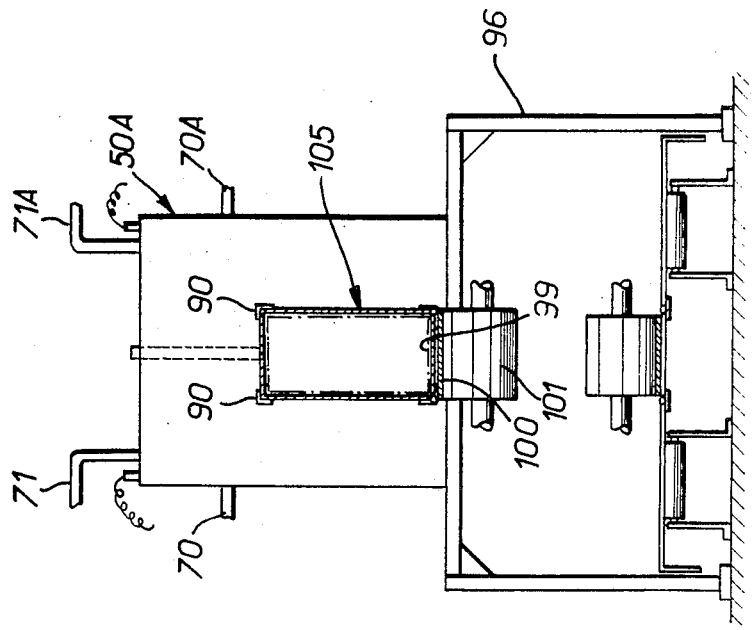
FIG. 13 shows a cross-section of the device of FIG. 9 taken along the line XIII—XIII.
Figure 12:
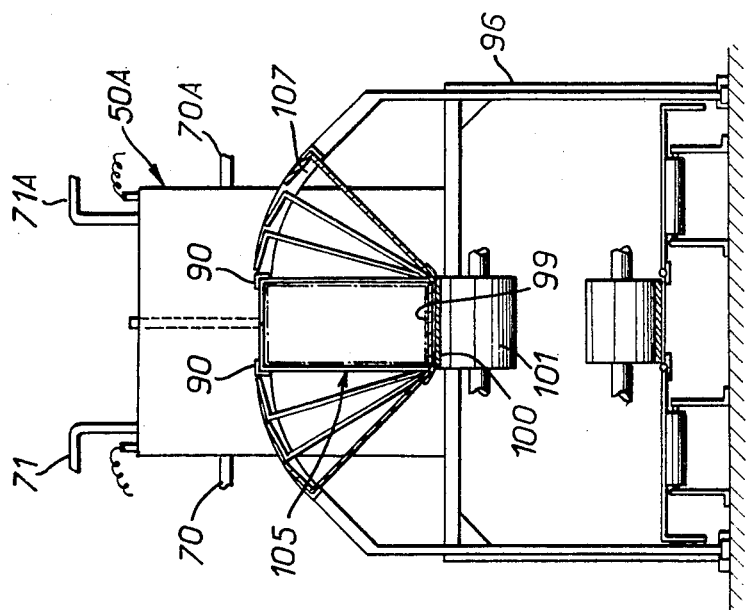
FIG. 12 shows a cross-section of the device of FIG. 9 taken along the line XII—XII.

The operation of the device described above is as follows:

The conveyor belt 1 is driven by the cylinder 2 over the cylinder 3 towards the mold 6. The edges of the belt come together as shown in FIG. 1 upon arriving at the entrance of the fixed mold. This operation is facilitated by the mold being disposed below the horizontal plane tangent to the uppermost parts of the cylinders 2 and 3. The conveyor belt thus forms a closed sheath which travels through the mold, as shown in FIGS. 2 and 3. Appropriate devices may be employed in order to facilitate the shaping of the belt such as the converging and diverging surfaces that will be discussed herein below.

A paste for forming the artificial sponge is composed of viscose, reinforcing fibers and porophorous material is supplied at a constant rate to the hopper 30 and then by the intermediary of the feed screw 31 and the sleeves 32 and 33, the paste is conveyed into the mold 6 inside the sheath formed by the conveyor belt. The paste which arrives under pressure in the fixed mold 6 forces the sheath against the passage or interior wall of the mold 6 which is entirely lined with the conveyor belt 1 (see FIG. 3). The sheath then conveys a roll of paste 35 thus formed through the mold where it takes on the shape of the interior wall or passage.

The paste moving through the mold 6 is subjected to an electric current transmitted by the shells forming the mold which serve as electrodes thereby causing the gradual coagulation of the paste during its passage through the mold. During the entire coagulation period, the conveyor belt 1 which sheaths the roll 35 of paste protects the latter against the rubbing against the interior wall of the mold 6. As the roll of paste coagulates, it shrinks in cross-section and therefore by means of the sheath it is protected against transverse displacements and therefore deformations in its surface.

At the outlet of the mold 6, the roll 35 is completely coagulated; the edges of the conveyor belt 1 begin to separate, the sheath opens out to reassume the flat configuration it had before reaching the driving cylinder 2. Liquid exudes from the paste as a saline solution during coagulation and passes from the mold via outlets 48 and 49 to the recovery tank 12. The roll of paste thus coagulated leaves the conveyor belt 1 and passes to treatment baths (not shown).

The conveyor belt 1 free of the roll of coagulated paste passes over the driving cylinder 2 where it is first washed by spray device 13. The sprayed water is collected in the tank 14. The conveyor belt 1 then passes over the cylinder 5 towards the return roller 7 and the washing tank 8 through which it is drawn by the conductive cylinder 9.

The rotating brushes 10 adjacent to the roller 9 enable the cleaning of the conveyor belt 1. At the outlet of the washing tank 8, the conveyor belt 1 is returned by the roller 11 to the cylinders 4 and 3.

FIGS. 5 and 6 show a first alternative embodiment of the mold for the device for the continuous manufacture of artificial sponges shown in FIG. 1. In this embodiment the mold 50 comprises an elongate outer casing having a rectangular cross section and formed of insulating material, see FIG. 6. The casing comprises a bottom wall 51, two opposed end walls 52 and two opposed side walls 53. The end walls 52 have openings 55 and 56 respectively having a shape corresponding to the desired section of the artificial sponge to be produced, a rectangular cross-section being shown in this embodiment. Accordingly, the end walls 52 are of inverted U-shape, the bottom of openings 56 and 57 being at the same level as the bottom wall 51.

A secondary or inner tank 69 is disposed within in the upper portion of a principal outer or tank and comprises longitudinal walls 80 and 81 of insulating material, a bottom wall 62 also of insulating material and two end walls which are formed by portions of the end walls 52 of the principal tank 59.

Perforate metal plates 64 and 65 which form the electrodes of the mold are fixed to the lower part of the walls 60 and 61 to the bottom wall 51 by any suitable securing means. The plates 64 and 65 in combination with the insulating bottom wall 62 of the secondary tank and the bottom wall 51 of the principal tank form a coagulation passage T intended to mold the paste which passes therethrough enveloped in a sheath 79 shown in phantom lines, the opposed longitudinal edges of the sheath come together along the under surface of the wall 62.

The perforate metal plates 64 and 65 are electrically connected across the bottom wall 51 to a transformer feed by a current source (not shown). The mold thus formed comprises a passage T forming a coagulation enclosure through which the paste maintained in the sheath passes and two compartments C and $C_1$ disposed on each side of the passage T. Overflow means 70 and 70A are provided for carrying away excess solution exuded from the paste during coagulation and stored in the compartments C and $C_1$ respectively in order to maintain the level N constant in the compartments C and $C_1$, the level N being such that the plates 64 and 65 are covered by liquid. Feed pipes 71 and 71A are provided to feed in recycled solution into their respective compartments. The mold described hereinabove is a so-called double wall mold in which the first walls are formed by the metal plates 64 and 65 and the second walls are formed by the walls 53 of the principal tank.

Such an arrangement enables the paste in the course of passing through the passage T or coagulation enclosure in the presence of an electrolyte solution or media owing to the perforate walls 64 and 65 in communication with the compartments C and $C_1$ enabling the free flow of solution therethrough.

A principal advantage of the present structure resides in the fact that the flow of current is favored by the presence of the electrolytic solution. Further, electric arcing is practically avoided, increasing the service life of the sheath and the homogeneity of the sponge. The rate of production is also substantially improved.

A further advantage of the present embodiment is that the displacement of electrical charges are substantially favored, the coagulation is improved thereby yielding more homogeneous sponges free of any production faults.

A still further advantage of the present invention resides in the fact that the solution carried away are subsequently reheated and cleaned by any suitable means (not shown) and returned to the compartments C and $C_1$ of the mold. This recycling of the solution enables a substantial improvement in the heat exchange capacity of the solution, the control of the concentration of the solution as well as enabling the compensation of possible losses of solution during the operation of the mold, however, it should be recalled that the coagulation of the paste produces solution forming the majority of the electrolyte.

FIG. 6A shows a slight variation of the embodiment of the mold of FIGS. 5 and 6, the same numbers indicating analogous elements. In this embodiment the electrodes are formed by plates 75 and 76 arranged parallel to and along the sides walls 53 of the principal tank. The passage T in this case comprises the perforate plates 77 and 78 formed of any insulating material and fixed between the bottom wall 51 of the principal tank and the bottom wall 62 of the secondary tank. The electrodes are preferably arranged as shown remote from the perforate walls though it is understood that they may be positioned closer to the perforate walls.

In this embodiment of the mold as in the preceding, an endless permeable sheath shown schematically at 39 enables the passage of the paste through the coagulation enclosure.

In another embodiment shown in FIGS. 7 and 8 the mold 50A comprises a tank similar to that of the two preceding embodiments formed of insulating material having an opening 81 and 82 in each of its end walls 52. A partition 83 is disposed in the upper part of the tank extending between the end walls 52 and fixed thereto in any suitable manner. The partition 83 is formed of insulating material and is formed as an inverted T, the vertical portion 84 acts as a divider for the solution disposed above the coagulation enclosure 85. The divider 84 orients the passage of current through the paste during coagulation; the horizontal portion 89 of the partition carries guiding means 90 the function of which will be brought below.

As in the previous embodiments the mold comprises two electrodes 75 and 76 arranged parallel to and spaced from the lateral walls 53, overflow orifices 70 and 70A and feed pipes 71 and 71A for introducing recycled solution. The electrodes comprise metal plates connected to a source of electric current via a transformer 5, not shown.

FIGS. 9–13 show a further embodiment in which the coagulation enclosure which in all the preceding embodiments was formed of fixed elements effecting the ultimate shape of the sponges. In the present embodiment the coagulation enclosure comprises a plurality of pairs of pivotable form members carried by a conveyor belt 100 and continuously passed through the liquid media in the mold thereby further improving the flow of current through the paste and thereby improving the coagulation of the paste.

The mold 50A is substantially the same as those in FIGS. 7 and 8 and is supported on a frame 96. The paste 97 to be coagulated is fed by a hopper (not shown). The combination A of pairs of pivotable form members is lined with a permeable sheath 59 (see FIGS. 11–13). The conveyor belt 100 transports the pivotable form members and the associated sheath. A recovery tank for recovering solution from coagulation enclosure is provided.

The conveyor belt 100 passes over rollers 101 at least one of which is driven. The pairs 105 of the pivoting form members are associated therewith as shown in FIGS. 10 and 10A.

Each of the pairs of pivotable form members comprises a base portion 105A of insulating material secured in any suitable manner to the conveyor belt 100 and two perforate plates 105B and 105C of conducting material pivoted on the associated base portion 105A by the hinges 105D and 105E parallel to the path of movement of the center of the conveyor belt. Each of the side plates 105B and 105C includes an overhanging portion 105F and 105G of insulating material in order to form die having a cross-section of substantially rectangular shape corresponding the shape of the article to be produced.

The pairs of form members are arranged on the conveyor belt 100 with spaces therebetween in order to enable the free pivoting of the side plates.

The conveyor belt 100 thus formed is adapted to pass through the mold 50A through which it is guided by the runners 90. A pair of converging longitudinal surfaces 107 are provided along the path of the conveyor belt upstream of the inlet E of the mold and a pair of divergent longitudinal surfaces 108 are provided along the path of the conveyor belt downstream of the outlet end of the mold. The converging surfaces 107 are intended to pivot the side plates 105A and 105B of the pairs of form members towards one another progressively in proportion to the movement in the direction of the arrow F. The pivoting of the plates before entering the mold follows the path shown in FIG. 11 wherein the plates in their flat position correspond to their position remote from the mold and in their vertical position with overlapping portions 105F and 105G in contact correspond to their position upon entering the mold. The intermediate positions are also shown. The plates are preferably washed during the converging of the plates.

At the output side of the mold a device 10 is provided which operates in cooperation with the divergent surface 108 in order to gradually open the form members in proportion to their movement from the outlet end of the mold until the flat or open position is reached.

The present invention is not limited to the various examples shown herein but includes all possible modifications, equivalents, and variations within the scope of the accompanying claims.

I claim:

1. A device for the continuous production of artificial sponges comprising: a fixed elongate mold having an inlet opening at one end, an outlet opening at the other and a passage disposed therebetween entirely enclosed within the mold, a permeable flexible sheath for carrying a paste composed of viscose, reinforcing material, and porophorous material continuously through said passage, electrode means arranged in the mold outwardly of the path of the sheath through the passage for passing an electric current through the paste being conveyed, and means for allowing solution exuded from the paste during the coagulation to pass outwardly through the enclosure in order to be collected.

2. A device according to claim 1, wherein the mold includes fluid heating means aiding the coagulation of the paste.

3. A device according to claim 1, wherein the permeable sheath is an endless belt, and wherein means for driving the sheath are provided including a roller located upstream of the mold and a roller located downstream of the mold, the horizontal plane tangent to the uppermost portions of said rollers being disposed in a horizontal plane above the horizontal plane tangent to the lowermost portion of the passage through the mold.

4. A device for the continuous production of artificial sponges comprising a fixed mold including a coagulation enclosure adapted to receive a constant procession of paste to be coagulated conveyed in a permeable sheath, at least two independent compartments being arranged adjacent the coagulation enclosure and containing electrolytic solution, means enabling the flow of solution between the compartments and the interior of the coagulation enclosure, and electrode means at least partially into the solutions in the compartments for applying an electric current for coagulating the paste.

5. A device according to claim 4, wherein the coagulation enclosure forms the interior walls of the mold, and wherein the means enabling the flow of the solution between the compartments and the interior of the coagulation enclosure includes perforations provided in said interior walls.

6. A device according to claim 5, wherein the electrodes means are formed by two perforate side walls of the interior walls of the mold.

7. A device according to claim 5, wherein the electrodes means are spaced from the interior perforate walls of the mold.

8. A device according to claim 4, wherein overflow outlets are provided in the compartments for maintaining the level of the solution constant, and wherein means are provided for recycling the solution leaving through the outlets.

9. A device according to claim 5, wherein the interior walls of the mold include a top wall, and wherein a partition extends upwards from said top wall to form the compartments.

10. A device according to claim 4, wherein the coagulation enclosure is transported by a conveyor belt through the interior of the mold.

11. A device according to claim 10, wherein coagulation enclosure comprises a plurality of a form members pivotally mounted on the conveyor belt between an open or flat position and a closed position adapted to conform to the passage in the mold.

12. A device according to claim 11, further comprising longitudinal convergent surfaces disposed upstream of the inlet for moving the pairs of form members from their flat position to their closed position before entering the mold.

13. A device according to claim 12, further comprising means for opening the closed pairs of form members disposed in the vicinity of the outlet of the mold and operating in combination with longitudinal divergent surfaces extending downstream from the outlet to gradually return of pairs of form members to their flat position.

14. A device according to claim 10, further comprising means for guiding the coagulation enclosure through the mold.

15. A device according to claim 14, wherein a recovery tank is disposed beneath the mold for collecting solution from overflow outlets in the mold for recycling and reheating.

* * * * *